US008890836B2

(12) United States Patent
Mizuhashi et al.

(10) Patent No.: US 8,890,836 B2
(45) Date of Patent: Nov. 18, 2014

(54) DETECTION DEVICE AND DISPLAY APPARATUS WITH OSCILLATION CONTROL

(75) Inventors: Hiroshi Mizuhashi, Kanagawa (JP); Kohei Azumi, Tokyo (JP); Kazunori Yamaguchi, Kanagawa (JP); Takayuki Nakanishi, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 487 days.

(21) Appl. No.: 13/067,637

(22) Filed: Jun. 16, 2011

(65) Prior Publication Data

US 2012/0007828 A1 Jan. 12, 2012

(30) Foreign Application Priority Data

Jul. 9, 2010 (JP) ................. 2010-156894

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0412* (2013.01)
USPC ........................................ 345/174; 345/173

(58) Field of Classification Search
CPC ................................. G06F 3/412; G06F 3/044
USPC ................................................ 345/173, 174
See application file for complete search history.

(56) References Cited

U.S. PATENT DOCUMENTS

| 8,144,125 B2 * | 3/2012 | Peng et al. ................... 345/173 |
| 8,259,086 B2 * | 9/2012 | Agari et al. .................. 345/173 |
| 2008/0088595 A1 * | 4/2008 | Liu et al. ...................... 345/173 |
| 2008/0122798 A1 | 5/2008 | Koshiyama et al. |
| 2010/0066391 A1 * | 3/2010 | Hirasaka et al. ............. 324/686 |
| 2010/0253550 A1 * | 10/2010 | Lin et al. ........................ 341/20 |

FOREIGN PATENT DOCUMENTS

| JP | 2005-275644 | 10/2005 |
| JP | 2006-023904 | 1/2006 |
| JP | 2008-117371 | 5/2008 |
| JP | 2009-289235 A | 12/2009 |
| WO | WO 2009063817 A1 * | 5/2009 ............. G06F 3/041 |

OTHER PUBLICATIONS

Japanese Office Action issued Oct. 29, 2013 for corresponding Japanese Application No. 2010-156894.

* cited by examiner

*Primary Examiner* — Kwang-Su Yang
(74) *Attorney, Agent, or Firm* — Rader, Fishman & Grauer PLLC (57) ABSTRACT

A detection device includes a sensor unit in which a plurality of detection electrodes is positioned in a detection surface, a selection unit that selects one of the plurality of detection electrodes or a plurality of detection electrodes, an oscillation unit in which an oscillation frequency is determined by a capacitance generated in the one or plurality of detection electrodes selected by the selection unit, a conversion unit that outputs a signal corresponding to the frequency of a signal from the oscillation unit, and a switch unit that performs electrical connection/disconnection between a wiring for connecting the oscillation unit and the selection unit and a constant voltage line.

2 Claims, 11 Drawing Sheets

DETECTION DEVICE AND DISPLAY APPARATUS WITH OSCILLATION CONTROL

BACKGROUND

The present disclosure relates to a detection device that may detect a position where an object (hereinafter, referred to as a "finger"), such as a finger, a hand, an arm, a pen, or the like, is brought into contact with a detection surface, detect the spatial position of the object such as the finger when the object is positioned in a place away from the detection surface, or detect a movement of the object on the detection surface, and to a display apparatus including the detection device.

In the related art, technologies that may input information through the touch of a finger or the like are known. Of these, as a notable technology, a display apparatus (see Japanese Unexamined Patent Application Publication No. 2005-275644, and Japanese Unexamined Patent Application Publication No. 2006-23904) that may enable information input in the same manner as that of a case where typical buttons are pressed by the finger or the like by touching various buttons displayed on a display with the finger or the like has been disclosed. These technologies may enable displays and buttons to be shared, thereby reducing the number of components and realizing space-saving.

As for a touch sensor for detecting the touch of the finger or the like, various types of sensors exist. However, as a widespread sensor, for example, an electrostatic capacitance-type sensor (see, Japanese Unexamined Patent Application Publication No. 2006-23904) may be given. In the electrostatic capacitance-type sensor, a change generated in a surface electric field of a touch panel is taken as a change in the frequency of a current flowing through a detection electrode by touching a touch panel with a finger or the like, thereby detecting the touch of a finger or the like.

In the above described detection method, a change generated in the surface electric field of the touch panel is read as a change in the frequency of the current flowing through the detection electrode. Due to this, a finger or the like is necessary to touch or sufficiently approach the surface of the touch panel. When the finger or the like is far from the surface of the touch panel (for example, being separated from the surface by 1 cm or more), information is not inputted to the touch panel. However, for example, as disclosed in Japanese Unexamined Patent Application Publication No. 2008-117371, even though the finger or the like is far from the surface of the touch panel, information may be inputted to the touch panel by changing an interval between detection electrodes neighboring to each other to correspond to a spatial position of an object. In Japanese Unexamined Patent Application Publication No. 2008-117371, the change in the interval between the neighboring detection electrodes is performed by thinning out the detection electrodes which scan.

SUMMARY

However, in the above described detection method, when the finger or the like approaches the detection electrode while driving the detection electrode, charges are accumulated in the detection electrode. In this case, since the electrostatic capacitance of the detection electrode changes depending on the amount of the accumulated charge, the detection sensitivity becomes unstable.

The present disclosure is to solve the above problem, and it is desirable to provide a detection device that stabilizes detection sensitivity while driving a detection electrode, and a display apparatus including the detection device.

According to an embodiment of the present disclosure, there is provided a detection device, including: a sensor unit in which a plurality of detection electrodes is positioned in a detection surface; a selection unit that selects one of the plurality of detection electrodes or the plurality of detection electrodes; and an oscillation unit in which an oscillation frequency is determined by a capacitance generated in the one or plurality of detection electrodes selected by the selection unit. The detection device may further include a conversion unit that outputs a signal corresponding to the frequency of a signal from the oscillation unit, and a switch unit that performs electrical connection/disconnection between a wiring for connecting the oscillation unit and the selection unit and a constant voltage line.

According to an embodiment of the present disclosure, there is provided a display apparatus, including: a display panel that displays an image on a display surface based on an image signal; and the detection device. Specifically, the display apparatus may include the display panel; a sensor unit in which a plurality of detection electrodes is disposed on the display surface; a selection unit that selects one of the plurality of detection electrodes or the plurality of detection electrodes; and an oscillation unit in which an oscillation frequency is determined by a capacitance generated in the one or plurality of detection electrodes selected by the selection unit. The display apparatus may further include a conversion unit that outputs a signal corresponding to the frequency of a signal from the oscillation unit, and a switch unit that performs electrical connection/disconnection between a wiring for connecting the oscillation unit and the selection unit and a constant voltage line.

In the detection device and the display apparatus according to an embodiment of the present disclosure, at least one of the conversion unit and the oscillation unit may be able to change states between being enabled or disabled. In this case, the detection device and the display apparatus of the present disclosure may further include a control unit that controls a change in the state of one of the oscillation unit and the conversion unit. For example, in a case where the conversion unit is able to change the states between being enabled or disabled, the control unit may disable the conversion unit while, for example, the selection unit selects the one or plurality of detection electrodes, and may connect, to the constant voltage line, the one or plurality of detection electrodes selected by the selection unit. In addition, for example, in a case where the oscillation unit is able to change the states between being enabled or disabled, the control unit may disable the oscillation unit while, for example, the selection unit selects the one or plurality of detection electrodes, and may connect, to the constant voltage line, the one or plurality of detection electrodes selected by the selection unit. In addition, in the display apparatus according to an embodiment of the present disclosure, the detection device may be integrally formed with the display panel, or formed separately from the display panel.

In the detection device and the display apparatus according to an embodiment of the present disclosure, the switch unit that performs electrical connection/disconnection between the wiring for connecting the oscillation unit and the selection unit and the constant voltage line may be provided. Thus, the switch unit may perform electrical connection/disconnection while driving the detection electrode, whereby charges accumulated in the detection electrode may be discharged to the constant voltage line through the switch unit.

For example, in the case where the conversion unit is able to change the states between being enabled or disabled, the control unit provided in the detection device and the display apparatus may turn on the switch unit when the conversion unit is disabled. In addition, in the case where the oscillation unit is able to change the states between being enabled or disabled, the control unit provided in the detection device and the display apparatus may turn on the switch unit when the oscillation unit is disabled. Thus, the one or plurality of detection electrodes selected by the selection unit may be connected to the constant voltage line through the switch unit, and the charges accumulated in the detection electrode may be discharged to the constant voltage line through the switch unit.

By the detection device and the display apparatus according to the embodiment of the present disclosure, charges accumulated in the detection electrode may be discharged to a constant voltage line through a switch unit, thereby eliminating accumulation of the charges in the detection electrode. As a result, since an electrostatic capacitance of the detection electrode may be stabilized, it is possible to stabilize detection sensitivity while driving the detection electrode.

DETAILED DESCRIPTION OF EMBODIMENTS

Hereinafter, exemplary embodiments of the disclosure will now be described in detail with reference to the accompanying drawings. Further, the description will be made in the following order:

1. Basic principles of contact detection and proximity detection (FIG. 1)
2. First embodiment (FIGS. 2 to 9)

Figure 1:
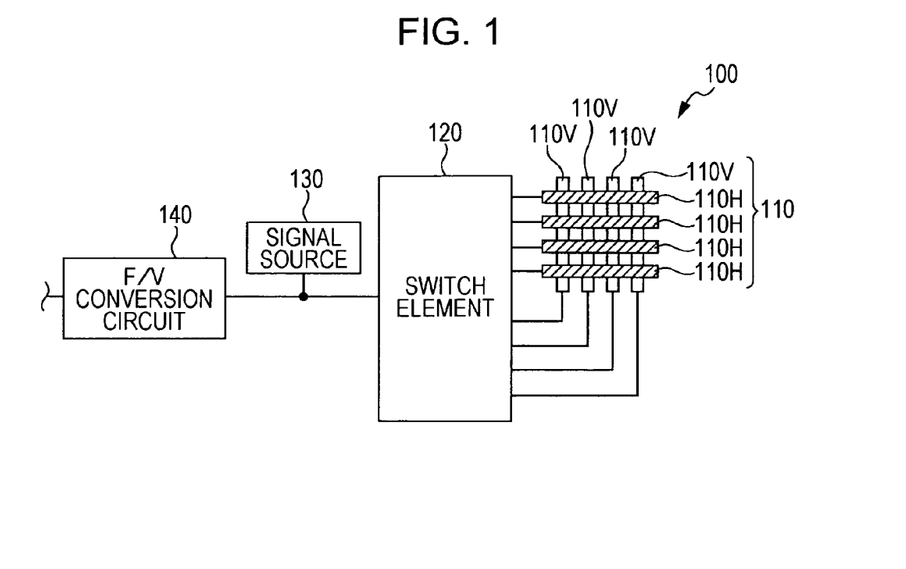
FIG. 1 is a view showing a configuration example of a detection device having contact and proximity detection functions.

Example in which liquid crystal display panel and touch panel are separately formed
3. Second embodiment (FIGS. 10 to 12)
Example in which liquid crystal display panel and touch panel are integrally formed
4. Modified example (FIG. 13)
Example of compensating change in frequency occurring due to temperature characteristics of oscillation unit, and the like 1. Basic Principles of Contact Detection and Proximity Detection First, basic principles of contact detection and proximity detection used in a display apparatus according to the following embodiment will be described. In FIG. 1, a configuration example of a detection device 100 that may perform contact detection and proximity detection is illustrated.

The detection device 100 is an electrostatic capacitance-type detection device, and for example, includes a two-dimensional electrode 110 as shown in FIG. 1. The two-dimensional electrode 110 is formed in a detection surface (not shown), and for example, includes a plurality of detection electrodes 110H and a plurality of detection electrodes 110V. The plurality of detection electrodes 110H within the plane is extended in the lateral direction, and arranged in parallel at a predetermined interval in the longitudinal direction. The plurality of detection electrodes 110V is extended in the longitudinal direction, and arranged in parallel at a predetermined interval in the lateral direction, within the plane parallel to a surface in which the plurality of detection electrodes 110H is disposed.

Other than the two-dimensional electrode 110, the detection device 100 further includes a switching element 120 for switching the two-dimensional electrode 110, a signal source 130 supplying alternating current (AC) signal to the two-dimensional electrode 110, and a frequency/voltage conversion circuit (F/V conversion circuit) 140. The switching element 120 is for example, a multiplexer. Each of a plurality of terminals provided in an end of the multiplexer is connected to an end of each of the plurality of detection electrodes 110H and the plurality of detection electrodes 110V, and a single terminal provided at the other end of the multiplexer is connected to the signal source 130 and the F/V conversion circuit 140.

In the detection device 100, by the switching element 120, each of the plurality of detection electrodes 110H is sequentially selected one by one, and each of the plurality of detection electrodes 110V is sequentially selected one by one. Thus, signals of the signal source 130 are sequentially applied to the plurality of detection electrodes 110H one by one, and sequentially applied to the plurality of detection electrodes 110V one by one. In addition, in the detection device 100, by the switching element 120, only predetermined electrodes of the plurality of detection electrodes 110H are sequentially selected one by one, and at the same time only predetermined electrodes of the plurality of detection electrodes 110V are sequentially selected one by one.

In this instance, when a finger or the like (not shown) is brought into contact with or brought close to a detection surface, a surface electric field of the detection surface is changed, and the frequency of a current flowing through the two-dimensional electrode 110 is changed due to the change in the surface electric field. The change in the frequency is converted into a change in a voltage by the F/V conversion circuit 140. By evaluating the change in the voltage, it is possible to detect a contact position of the finger or the like on the detection surface, a spatial position of the finger or the like separated from the detection surface, and a movement of the finger or the like on the detection surface.

2. First Embodiment

Figure 2:
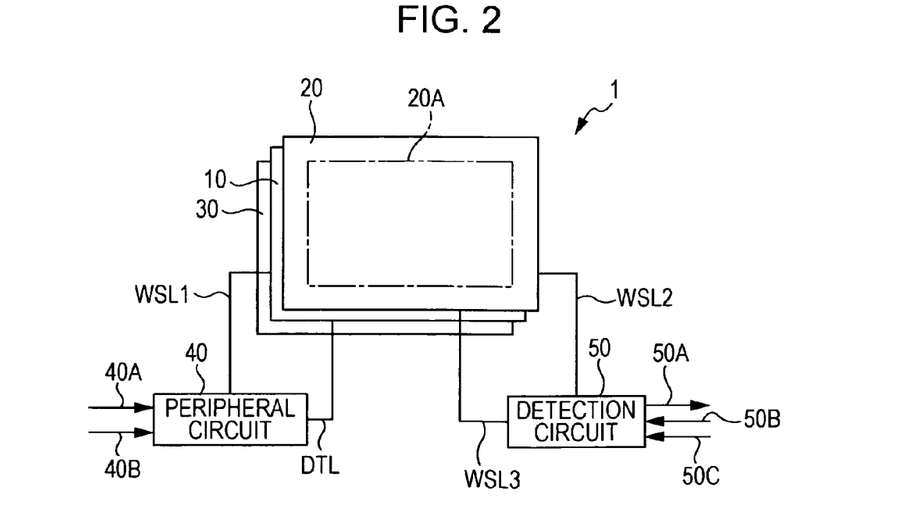
FIG. 2 is a view showing a configuration example of a display apparatus according to a first embodiment of the present disclosure.

In FIG. 2, an example of a schematic configuration of a display apparatus 1 according to a first embodiment of the disclosure is illustrated. The display apparatus 1 is a display apparatus with a touch sensor (and proximity sensor), and includes, for example, a liquid crystal display device as a display device. In addition, the display apparatus 1 includes an electrostatic capacitance-type touch sensor (and proximity sensor) on a surface of the liquid crystal display device, separately from the liquid crystal element.

The display apparatus 1 includes a liquid crystal display panel 10, a touch panel 20, a backlight 30, a peripheral circuit 40 and a detection circuit 50, as shown in FIG. 2. The touch panel 20 is disposed in a viewer side (front side) of the liquid crystal display panel 10, and the backlight 30 is disposed behind the liquid crystal display panel 10.

[Liquid Crystal Display Panel 10]

The liquid crystal display panel 10 transmits and modulates light from a light source (backlight 30) to thereby perform an image display by changing an array of liquid crystal molecules. The liquid crystal display panel 10 is a transmission-type display panel in which a plurality of pixels (not shown) arranged in a matrix is driven by the peripheral circuit 40 in accordance with an image signal 40A and a sync signal 40B. The liquid crystal display panel 10 includes, for example, a plurality of scanning lines WSL1 arranged in rows and a plurality of signal lines DTL arranged in columns. The plurality of pixels is disposed in a matrix form in accordance with an intersection part of each of the scanning lines WSL1 and each of the signal lines DTL.

[Touch Panel 20]

The touch panel 20 is used to input information in such a manner as that in which a finger or the like is brought into contact with an image display surface 20A (surface of touch panel 20) of the display apparatus 1, brought close to an image display surface 60A, or is moved on the image display surface 60A. The touch panel 20 is provided separately from, for example, the liquid crystal display panel 10, and is bonded to a surface of the liquid crystal display panel 10 through an adhesive (not shown). The touch panel 20 corresponds to a specific example of the above described electrostatic capacitance-type touch sensor, and detects, in an XY matrix, contact or non-contact, spatial position, or movement.

[Backlight 30]

The backlight 30 illuminates the liquid crystal display panel 10 from the rear, and includes, for example, a light guide plate, a light source disposed in a side surface of the light guide plate, and an optical element disposed on an upper surface (light emitting surface) of the light guide plate. The light guide plate guides light from the light source to the upper surface of the light guide plate, and functions to scatter and equalize light incident from the side. The light source is a linear light source, and is obtained by arranging, for example, a Hot Cathode Fluorescent Lamp (HCFL), a Cold Cathode Fluorescent Lamp (CCFL), and a plurality of Light Emitting Diodes (LED) in a row. The optical element is configured such that, for example, a diffusion plate, a diffusion sheet, a lens film, a polarization separation sheet, and the like are stacked.

[Detection Device 2]

Figure 3:
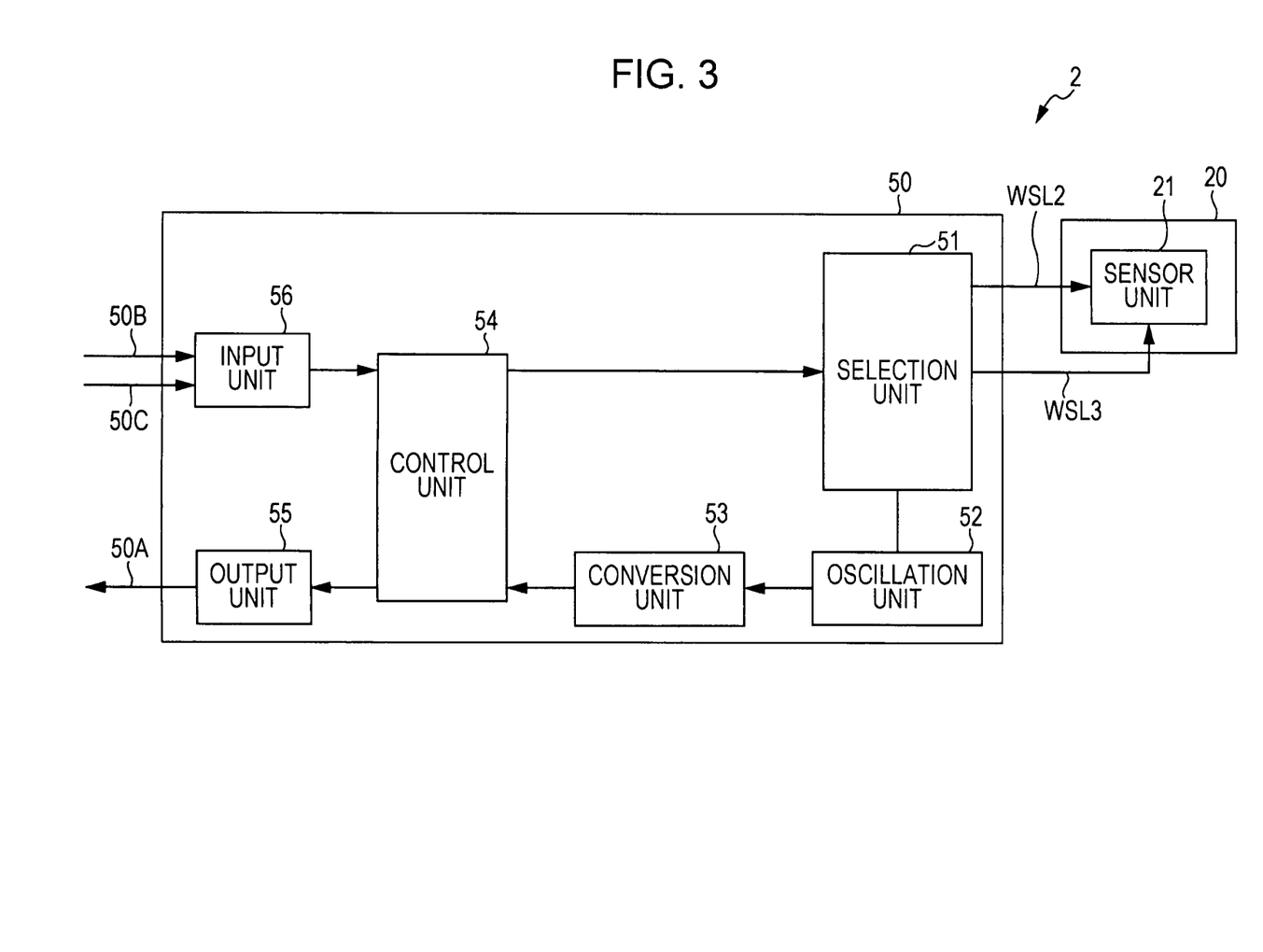
FIG. 3 is a view showing a configuration example of a detection device included in the display apparatus of FIG. 2.
Figure 4:
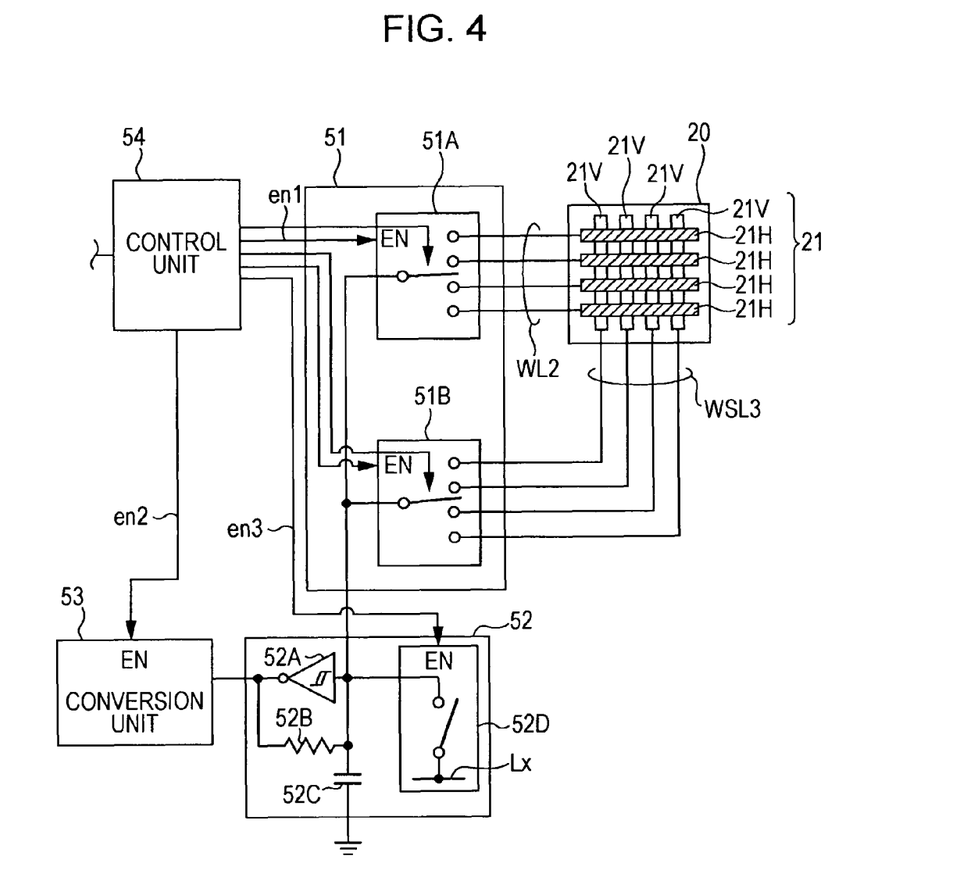
FIG. 4 is a view showing an internal configuration example of the detection device of FIG. 3.

In FIG. 3, a part (detection device 2) of the display apparatus 1 involved in contact and non-contact detection, spatial position detection, and movement detection is extracted. The detection device 2 is a detection device capable of performing contact detection and proximity detection similarly to the detection device 100 shown in FIG. 1, and includes, for example, the touch panel 20 and the detection circuit 50, as shown in FIG. 4. The touch panel 20 includes, for example, a sensor unit 21. In addition, the detection circuit 50 includes, for example, a selection unit 51, an oscillation unit 52, a conversion unit 53, a control unit 54, an output unit 55, and an input unit 56.

The sensor unit 21 detects contact or non-contact of a finger or the like with the image display surface 20A, spatial position, or movement. The sensor unit 21 is formed on the image display surface 20A, that is, a detection surface, and includes, for example, a plurality of detection electrodes 21H and a plurality of detection electrodes 21V as shown in FIG. 4. The plurality of detection electrodes 21H within a single plane is extended in the lateral direction, and arranged in parallel at a predetermined interval in the longitudinal direction. The plurality of detection electrodes 21V, within a plane parallel to a surface where the plurality of detection electrodes 21H is arranged, is extended in the longitudinal direction, and arranged in parallel at a predetermined interval in the lateral direction.

The selection unit 51 performs electrical connection/disconnection between each of the detection electrodes 21H and 21V of the sensor unit 21 and the oscillation unit 52. Specifically, the selection unit 51 selections one or a plurality of detection electrodes from the plurality of detection electrodes 21H and 21V, and connects the selected one or plurality of detection electrodes 21H and 21V and the oscillation unit 52. The selection unit 51 includes a switching element 51A for switching the plurality of detection electrodes 21H (four detection electrodes 21H in FIG. 4), and a switching element 51B for switching the plurality of detection electrodes 21V (four detection electrodes 21V in FIG. 4).

Each of the switching elements 51A and 51B is, for example, a multiplexer. In the switching element 51A, each of a plurality of terminals provided in an end of the multiplexer is connected to an end of each of the detection electrodes 21H through a scanning line WSL2, and a single terminal provided at the other end of the multiplexer is connected to the oscillation unit 52 through a wiring. In addition, in the switching element 51B, each of the plurality of terminals provided in the end of the multiplexer is connected to an end of each of the detection electrodes 21V through a scanning line WSL3, and a single terminal provided at the other end of the multiplexer is connected to the oscillation unit 52 through the wiring.

The switching elements 51A and 51B switch an internal switch in response to a selection signal and an EN signal (described later) inputted from the control unit 54. When the EN signal is enabled, the switching elements 51A and 51B electrically connect a terminal selected by the selection signal from a plurality of terminals of the sensor unit 21 side and terminals of the opposite side to the sensor unit 21 side. When the EN signal is disabled, the switching elements 51A and 51B electrically open all of the terminals of the sensor unit 21 side and the terminals of the opposite side to the sensor unit 21 side.

The oscillation unit 52 determines an oscillation frequency by a capacitance generated in the one or plurality of detection electrodes 21H and 21V which are selected by the selection unit 51. The oscillation unit 52 includes, for example, a signal source 52A generating an AC signal, a resistance 52B connected to the signal source 52A in parallel, and a capacitance element 52C connected to a terminal (hereinafter, referred to as "terminal A") connected to the selection unit 51 from among both terminals of the signal source 52A and the resistance 52B connected to each other in parallel. In addition, the oscillation unit 52 includes, for example, a switch unit 52D connected to the terminal A. The oscillation unit 52 applies the AC signal to each of the detection electrodes 21H through the terminal A and the switching element 51A, and applies the AC signal to each of the detection electrodes 21V through the terminal A and the switching element 51B.

The switch unit 52D performs electrical connection/disconnection between the terminal A and a constant voltage line Lx, and for example, turns ON/OFF in response to a control signal from the control unit 54. The switch unit 52D is in an OFF state at least when one of the detection electrodes 21H and 21V detects contact and non-contact of a finger or the like with the image display surface 20A, a spatial position, or a movement. In addition, the switch unit 52D is in an ON state when charges accumulated in each of the detection electrodes 21H and 21V are discharged, as will be described later.

The conversion unit 53 outputs a signal corresponding to the frequency of a signal from the oscillation unit 52, and includes, for example, a clock counter, which is not shown. The clock counter counts the frequency of the signal from the oscillation unit 52, and outputs a digital signal according to the number of counts. In addition, the conversion unit 53 is able to change states between being enabled or disabled in accordance with the EN signal (described later) inputted from the control unit 54.

In addition, the conversion unit 53 may include an F/V conversion circuit and an A/D converter. The F/V conversion circuit converts the signal from the oscillation unit 52 into voltage in accordance with the frequency. The F/V conversion circuit converts a signal of an output terminal of the oscillation unit 52 into a voltage value corresponding to the magnitude of the frequency of the signal, and outputs an analog signal of the voltage value. The A/D converter converts the inputted analog signal into a digital signal, and converts, for example, the analog signal outputted from the F/V conversion circuit into the digital signal.

The output unit 55 outputs contact coordinates and the like derived in the control unit 54 as the detection signal 50A. The input unit 56 receives an input of a sync signal 50B used when driving the detection circuit 50 and an input of a position signal 50C indicating the coordinates of a functional part such as a button and the like displayed on the image display surface 20A.

The control unit 54 derives the contact coordinates of a finger or the like, spatial position, or movement based on a signal concerning the frequency inputted from the conversion unit 53. In addition, the control unit 54 controls each of the switching elements 51A and 51B included in the selection unit 51. The control unit 54 generates a selection signal in which the selection unit 51 sequentially selects only a part of the plurality of detection electrodes 21H and 21V, and applies the generated selection signal to the selection unit 51 (each of the switching elements 51A and 51B). Specifically, the control unit 54 switches an internal switch of each of the switching elements 51A and 51B by inputting the EN signal and the selection signal to each of the switching elements 51A and 51B.

The control unit 54 inputs a disable signal as the EN signal to the switching element 51A at a predetermined time. Thus, in the switching element 51A, all of the terminals of the sensor unit 21 side and terminals of the opposite side to the sensor unit 21 side are electrically opened. Similarly, the control unit 54 inputs a disable signal as the EN signal to the switching element 51B at a predetermined time. Thus, in the switching element 51B, all of the terminals of the sensor unit 21 side and the terminals of the opposite side to the sensor unit 21 side are electrically opened.

In addition, the control unit 54 inputs a selection signal to the switching element 51A, and inputs an enable signal as the EN signal at a predetermined time. Thus, in the switching element 51A, a terminal selected as the selection signal from among a plurality of terminals of the sensor unit 21 side and a terminal of the opposite side to the sensor unit 21 side are electrically connected. Similarly, the control unit 54 inputs a selection signal to the switching element 51B, and inputs an enable signal as the EN signal at a predetermined time. Thus, in the switching element 51B, a terminal selected by the selection signal from among a plurality of terminals of the sensor unit 21 side and a terminal of the opposite side to the sensor unit 21 are electrically connected.

Figure 5:
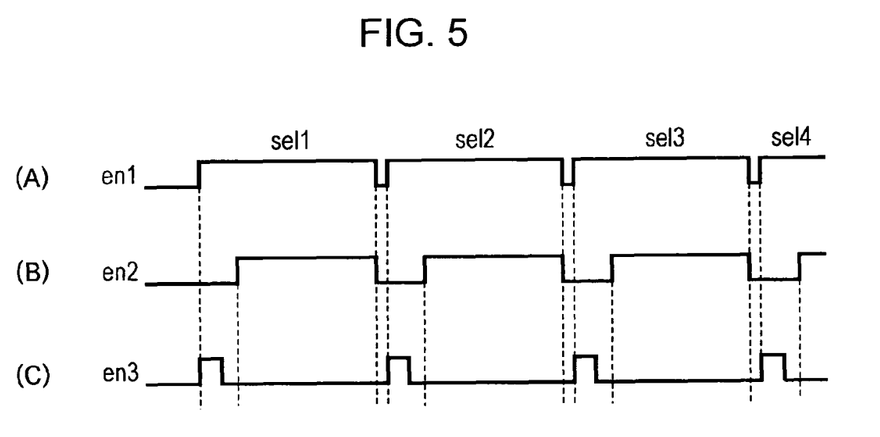
FIG. 5 is a waveform diagram obtained when the detection device of FIG. 3 is operated.

For example, when names such as sel1, sel2, sel3, and sel4 are sequentially granted to four terminals of the sensor unit 21 side of the switching elements 51A and 51B, the control unit 54 inputs the selection signal to the switching elements 51A and 51B, and at the same time inputs the enable signal as the EN signal, so that the control unit 54 sequentially selects four terminals sel1, sel2, sel3, and sel4 one by one, as shown (A) of in FIG. 5.

The control unit 54 controls the switch unit 52D included in the oscillation unit 52, and the conversion unit 53. Specifically, the control unit 54 is able to change states of the switch unit 52D and the conversion unit 53 between being enabled or disabled by inputting the EN signal (described later) to the switch unit 52D and the conversion unit 53.

For example, the control unit 54 inputs the disable signal as the EN signal to the switch unit 52D, and enables the switch unit 52D to be in an OFF state (see (A) to (C) of FIG. 5), at least when each of the detection electrodes 21H and 21V detects the contact or non-contact of a finger or the like with the image display surface 20A, spatial position, or movement (for example, when the switching element 51A or 51B is in an enabled state, and the conversion unit 53 is in an enabled state). In this instance, the one or plurality of detection electrodes 21H and 21V selected by the selection unit 51 is connected to the oscillation unit 52, and separated from a constant voltage line Lx.

In addition, for example, when discharging charges accumulated in each of the detection electrodes 21H or 21V (for example, when the switching element 51A or 51B is in an enabled state, and the conversion unit 53 is in a disabled state), the control unit 54 inputs the enable signal as the EN signal to the switch unit 52D, and enables the switch unit 52D to be in an ON state (see (A) to (C) of FIG. 5). In this instance, the one or plurality of detection electrodes 21H and 21V selected by the selection unit 51 is connected to the constant voltage line Lx through the switch unit 52D.

However, the timing when the enable signal as the EN signal is inputted to the switch unit 52D is preferable, for example, when the selection unit 51 selects the one or plurality of detection electrodes 21H and 21V as shown in (A) to (C) of FIG. 5, and immediately before enabling the conversion unit 53 to be enabled.

Next, an example of operations of the detection device 2 according to the present embodiment will be described.

[Entire Operation]

First, for example, by turning on a power supply for the display apparatus 1 and the start of the detection device 2, an operation of the detection device 2 starts by the control unit 54. First, the control unit 54 inputs an enable signal as the EN signal to the switching element 51A or 51B, and inputs the selection signal selecting one or a plurality of detection electrodes 21H and 21V. In addition, the control unit 54 inputs a disable signal as the EN signal to the conversion unit 53, and inputs an enable signal as the EN signal to the switch unit 52D. Thus, the one or plurality of detection electrodes 21H and 21V selected by the selection signal and the constant voltage line Lx are connected through the switch unit 52D. As a result, charges accumulated in the one or plurality of detection electrodes 21H and 21V connected to the constant voltage line Lx are discharged to the constant voltage line Lx through the switch unit 52D, so that the potential of the one or plurality of detection electrodes 21H and 21V connected to the constant voltage line Lx is changed to a potential of the constant voltage line Lx. In this instance, when the potential of the constant voltage line Lx is changed to a ground potential, the potential of the one or plurality of detection electrodes 21H and 21V connected to the constant voltage line Lx is also changed to the ground potential. In addition, the potential of the constant voltage line Lx may be changed to a potential different from the ground potential.

Next, the control unit 54 inputs a disable signal as the EN signal to the switch unit 52D. Thus, the one or plurality of detection electrodes 21H and 21V selected by the selection signal is separated from the constant voltage line Lx. Next, the control unit 54 inputs an enable signal as the EN signal to the conversion unit 53. Thus, the one or plurality of detection electrodes 21H and 21V selected by the selection signal is connected to the conversion unit 53 through the oscillation unit 52. In this instance, when a finger or the like is brought close to or brought into contact with the image display surface 20A, a change in the electrostatic capacitance generated in the detection electrodes 21H and 21V is detected, as a change in the frequency of the oscillation unit 52, in the conversion unit 53 by the proximity or contact of the finger or the like with the image display surface 20A. The frequency (or change in the frequency) detected in the conversion unit 53 is transmitted to the control unit 54, and the control unit 54 derives the contact coordinates of the finger or the like, spatial position, or movement based on information about the frequency (or change in the frequency) detected in the conversion unit 53. The control unit 54 inputs, to the output unit 55, information about the derived contact coordinates of the finger or the like, spatial position, or movement, and the output unit 55 outputs the inputted information as the detection signal 50A to the outside.

In addition, the control unit 54 inputs the disable signal as the EN signal to the conversion unit 53 and the switching elements 51A or 51B after a prescribed time has elapsed during which the enable signal is inputted as the EN signal to the conversion unit 53. Thereafter, the control unit 54 repeatedly performs the above described procedure while sequentially changing the selection of the detection electrodes 21H and 21V. Thus, in the detection device 2 according to the present embodiment, the contact coordinates of the finger or the like, spatial position, or movement is detected.

[Effects]

In the present embodiment, the switch unit 52D performing electrical connection/disconnection between the wiring for connecting the oscillation unit 52 and the selection unit 51 and the constant voltage line Lx is provided in the detection device 2. Thus, the switch unit 52D performs the electrical connection/disconnection while driving the detection electrodes 21H and 21V, so that charges accumulated in the detection electrodes 21H and 21V are discharged to the constant voltage line Lx through the switch unit 52D. For example, when the conversion unit 53 is in a disabled state, the control unit 54 enables the switch unit 52D to be in an ON state, so that the one or plurality of detection electrodes 21H and 21V selected by the selection unit 51 is connected to the constant voltage line Lx through the switch unit 52D, and the charges accumulated in the detection electrodes 21H and 21V are discharged to the constant voltage line Lx through the switch unit 52D. As a result, it is possible to eliminate accumulation of the charges in the detection electrodes 21H and 21V, and to stabilize the electrostatic capacitance of the detection electrodes 21H and 21V, so that it is possible to stabilize detection sensitivity while driving the detection electrodes 21H and 21V.

Modified Example

Figure 6:
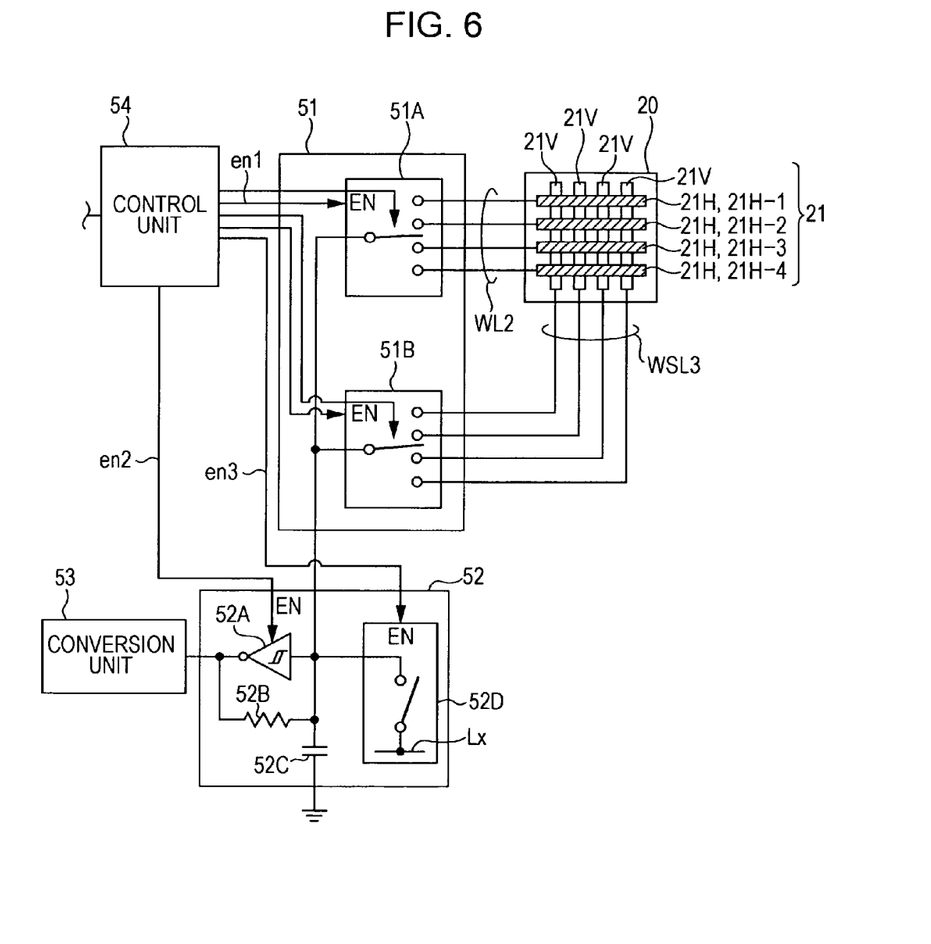
FIG. 6 is a view showing another internal configuration example of the detection device of FIG. 4.

In the above described embodiment, the conversion unit 53 is able to change the states between being enabled or disabled, however, the oscillation unit 52 may be able to change the states between being enabled or disabled as shown in FIG. 6.

For example, at least when each of the detection electrodes 21H and 21V detects contact or non-contact of a finger or the like with the image display surface 20A, spatial position, or movement (for example, when the switching element 51A or 51B is in an enabled state, and the oscillation unit 52 is in an enabled state), the control unit 54 inputs a disable signal as the EN signal to the switch unit 52D, and the switch unit 52D is in an OFF state (see, (A) to (C) of FIG. 5). In this instance, the one or plurality of detection electrodes 21H and 21V selected by the selection unit 51 is connected to the oscillation unit 52, and separated from the constant voltage line Lx.

In addition, for example, when discharging charges accumulated in each of the detection electrodes 21H or 21V (for example, when the switching element 51A or 51B is in an enabled state, and the oscillation unit 52 is in a disabled state), the control unit 54 inputs the enable signal as the EN signal to the switch unit 52D, and enables the switch unit 52D to be in an ON state (see (A) to (C) of FIG. 5). In this instance, the one or plurality of detection electrodes 21H and 21V selected by the selection unit 51 is connected to the constant voltage line Lx through the switch unit 52D.

However, in the above described modified embodiment, the timing when the enable signal as the EN signal is inputted to the switch unit 52D is when the selection unit 51 selects the one or plurality of detection electrodes 21H and 21V, and is preferable immediately before enabling the oscillation unit 52 to be enabled.

Figure 7:
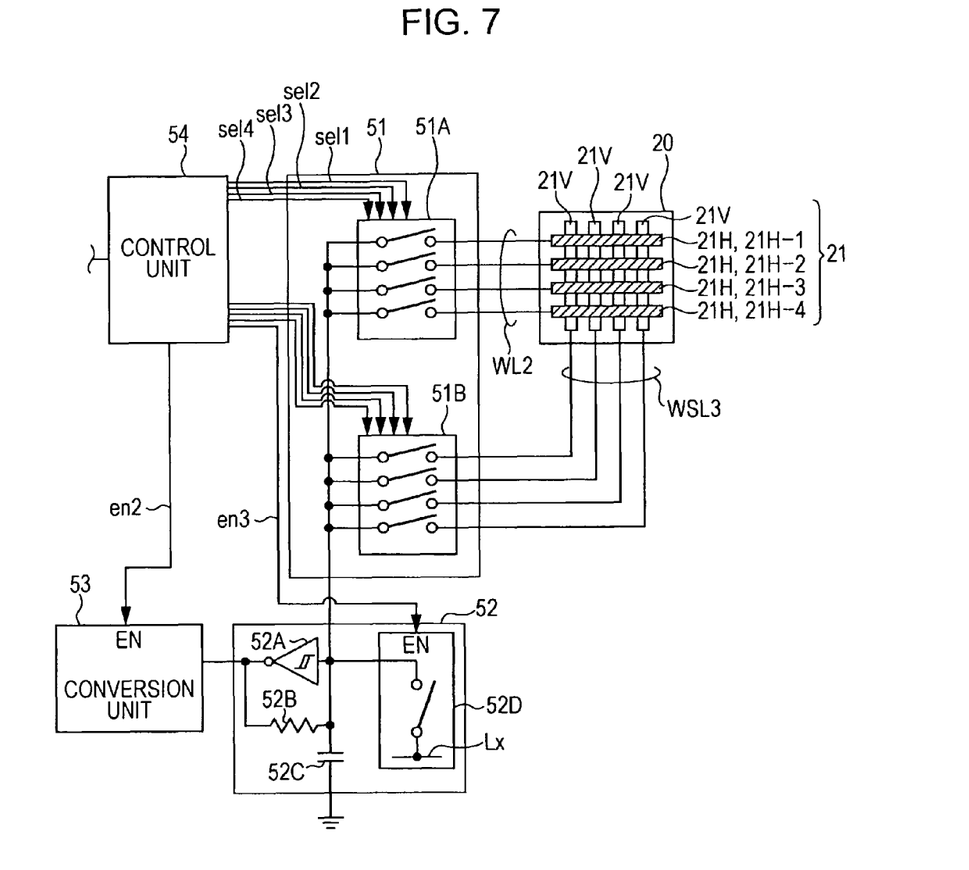
FIG. 7 is a view showing another internal configuration example of the detection device of FIG. 4.
Figure 8:
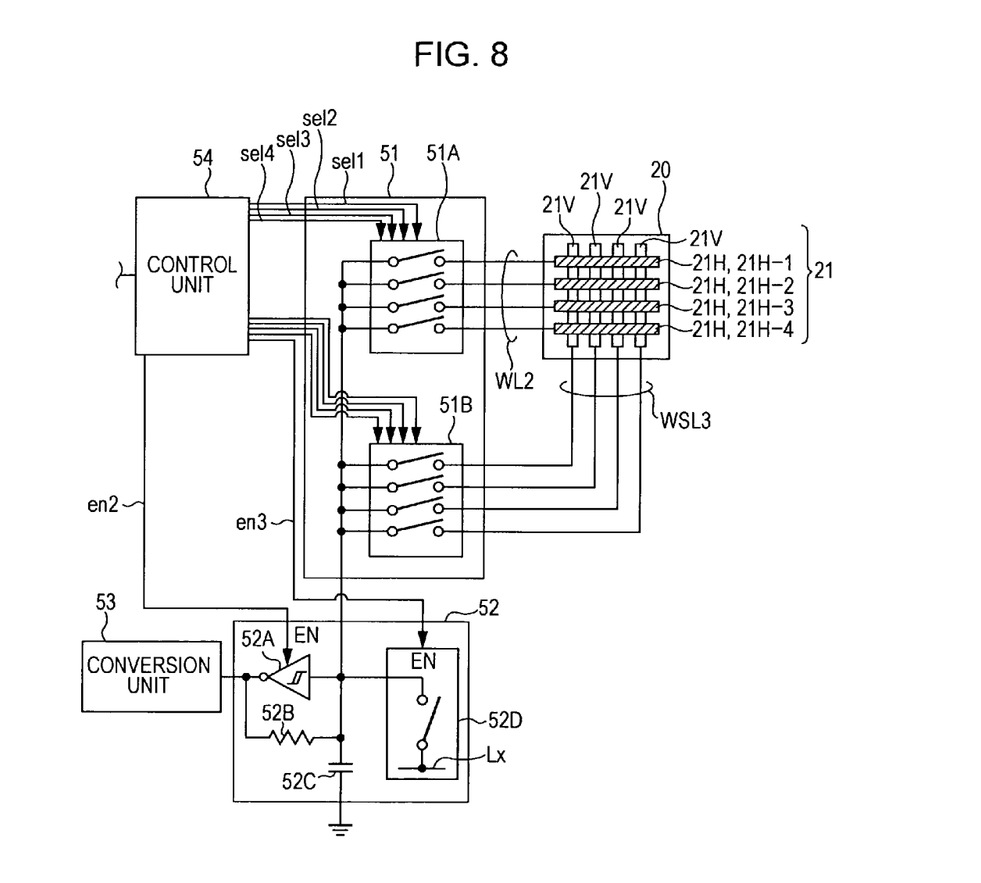
FIG. 8 is a view showing another internal configuration example of the detection device of FIG. 6.
Figure 9:
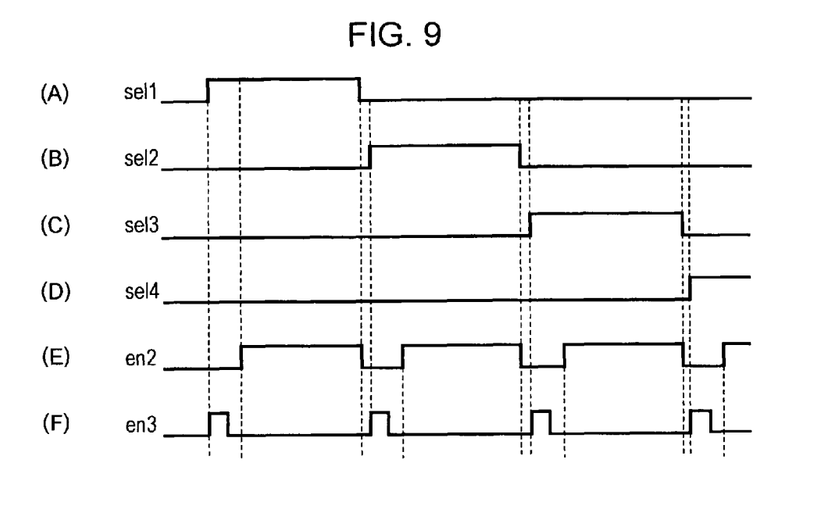
FIG. 9 is a waveform diagram obtained when the detection device of FIGS. 7 and 8 is operated.

In addition, in the above modified embodiment, the switching elements 51A and 51B are the multiplexer, however, for example, they may be formed such that each of a plurality of switches is arranged in parallel to the others, as shown in FIGS. 7 and 8. In this case, the control unit 54 may input, to the switching elements 51A and 51B, an on/off control signal for each switch within the switching elements 51A and 51B, for example, as shown in (A) to (D) of FIG. 9, instead of the EN signal and the selection signal.

3. Second Embodiment

Figure 10:
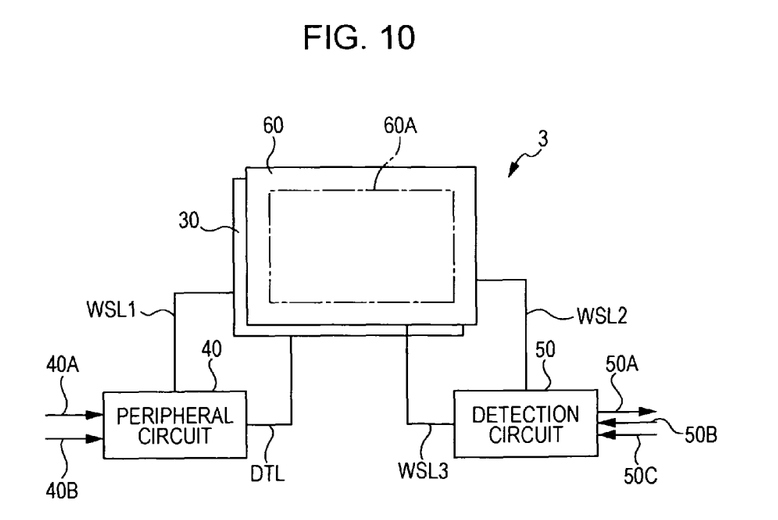
FIG. 10 is a view showing a configuration example of a display apparatus according to a second embodiment of the present disclosure.

In FIG. 10, an example of a schematic configuration of a display apparatus 3 according to a second embodiment of the disclosure is illustrated. The display apparatus 3 is a display apparatus with a touch sensor (and proximity sensor), and includes, for example, a liquid crystal display device as a display device. In addition, the display apparatus includes an electrostatic capacitance-type touch sensor (and proximity sensor) formed on a surface of the liquid crystal display device in such a manner as to be integrally formed with the liquid crystal display device. The display apparatus 3 includes the same configuration as that of the detection device 2 relating to the above described embodiment and the modified example. In this respect, the display apparatus 3 is common to the configuration of the display apparatus 1 relating to the above described embodiment and the modified example.

The display apparatus 3 includes, for example, a liquid crystal display panel 60 with a touch sensor, a backlight 30, a peripheral circuit 40, and a detection circuit 50, as shown in FIG. 10. The backlight 30 is disposed in the rear of the liquid crystal display panel 60 with the touch sensor.

[Liquid Crystal Display Panel 60 with Touch Sensor]

The liquid crystal display panel 60 with the touch sensor displays an image on an image display surface 60A (surface of the liquid crystal display panel 60 with the touch sensor) of the display apparatus 3, and at the same time inputs information by a finger or the like being brought into contact with the image display surface 60A (surface of the liquid crystal display panel 60 with the touch sensor), by the finger or the like being brought close to the image display surface 60A, or by the finger or the like being moved on the image display surface 60A of the display apparatus 3. The liquid crystal display panel 60 with the touch sensor detects, in an XY matrix, contact and non-contact, a spatial position, or a movement.

Figure 11:
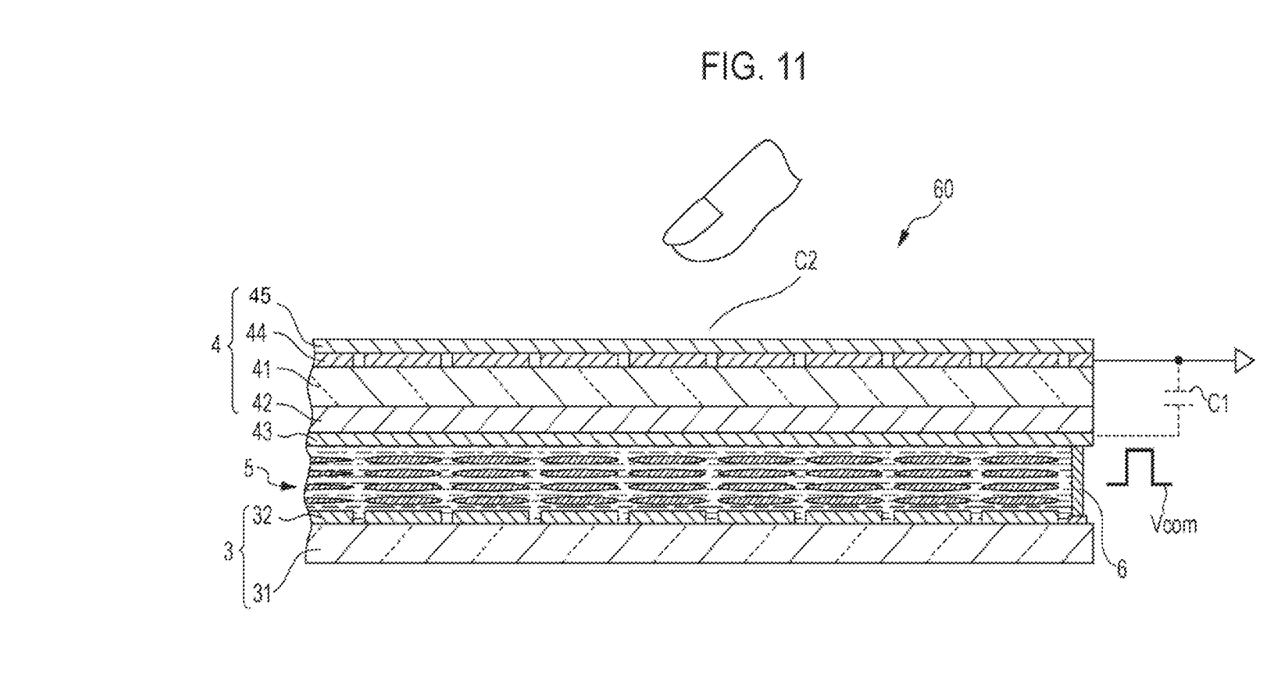
FIG. 11 is a view showing a configuration example of a cross section of a liquid crystal display panel with a touch sensor of FIG. 10.

In FIG. 11, an example of a configuration sectional view of a main part of the liquid crystal display panel 60 with the touch sensor is illustrated. The liquid crystal display panel 60 with the touch sensor constitutes an electrostatic capacitance-type touch sensor by sharing a part of an electrode (common electrode 43 which will be described later) originally provided in the liquid crystal display panel, and a display driving signal (common driving signal Vcom which will be described later). The liquid crystal display panel 60 with the touch sensor is formed such that a liquid crystal layer 5 is inserted between a pixel substrate 3 and a counter substrate 4 disposed facing the pixel substrate 3.

The pixel substrate 3 includes a TFT substrate 31 as a circuit substrate, and a plurality of pixel electrodes 22 arranged on the TFT substrate 31 in a matrix. In the TFT substrate 21, a wiring such as a source line supplying an image signal to each of the pixel electrodes and a gate line driving each of the TFTs are formed, other than a display driver and a TFT (thin film transistor) for driving each of the pixel electrodes 22 which are not shown.

The counter substrate 4 includes a glass substrate 41, a color filter 42 formed on a surface of the glass substrate 41, and a common electrode 43 formed on the color filter 42. The color filter 42 is formed such that a color filter layer having three colors such as red (R), green (G), and blue (B) is periodically arranged, and is associated with the three colors of R, G, and B as a single set for each display pixel (pixel electrode 32). The common electrode 43 is shared as a driving electrode for a sensor that constitutes a part of the touch sensor performing a touch detection operation.

The common electrode 43 is connected to the TFT substrate 31 by a contact conducting cylinder 6. Through the contact conducting cylinder 6, the common driving signal Vcom having an AC rectangular waveform is applied from the TFT substrate 31 to the common electrode 43. The common driving signal Vcom defines a display voltage of each pixel together with a pixel voltage applied to the pixel electrode 32, however, it is shared as the driving signal of the touch sensor. That is, the common driving signal Vcom reverses polarity every predetermined period.

A detection electrode 44 for a sensor is formed on the other surface of the glass substrate 41, and a polarizing plate 45 is disposed on the detection electrode 44 for the sensor. The detection electrode 44 for the sensor constitutes a part of the touch sensor. The liquid crystal layer 5 modulates light passing through an electrical field in accordance with a state of the electrical field, and liquid crystal of various modes such as TN (twisted nematic), VA (vertically aligned), ECB (electric control birefringence), and the like. In FIG. 11, a capacitance element C1 corresponds to a (electrostatic) capacitance element formed between a single common electrode 43 and a single detection electrode 44 for the sensor.

Figure 12:
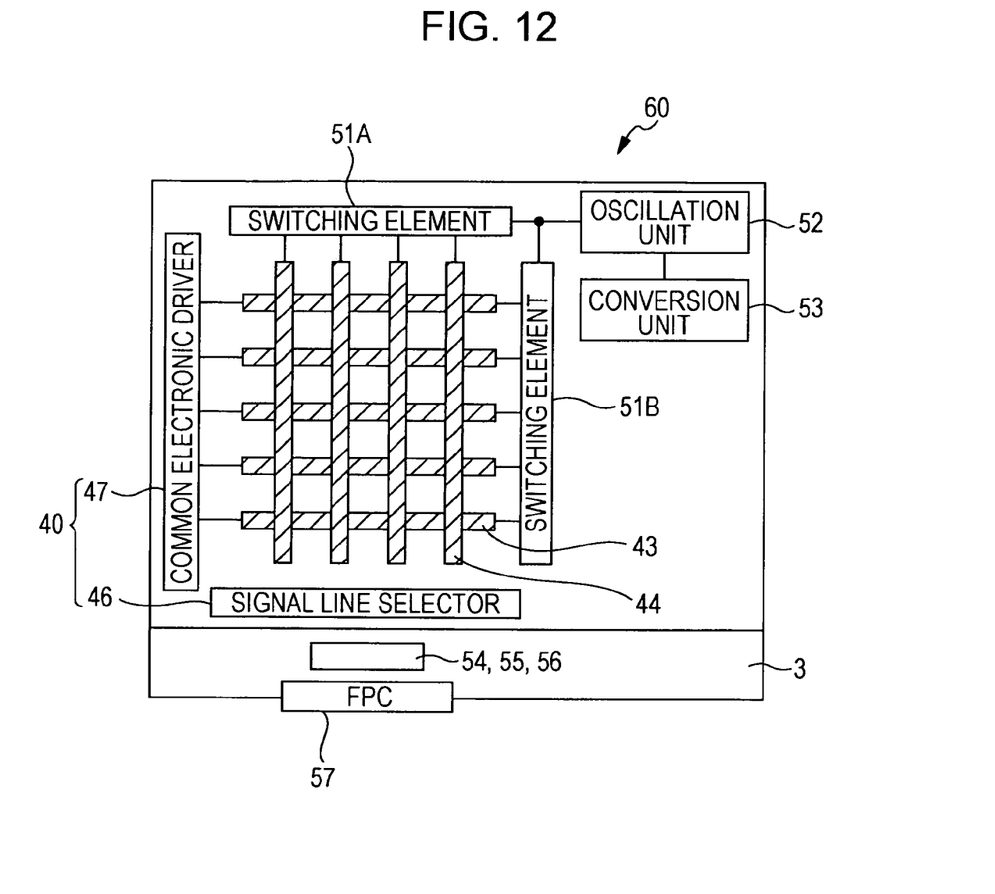
FIG. 12 is a view showing an example of a layout within the plane of each component in a liquid crystal display panel with a touch sensor of FIG. 11.

In FIG. 12, an example of a layout within the liquid crystal display panel 60 with the touch sensor is illustrated. A plurality of common electrodes 43 and a plurality of detection electrodes 44 for the sensor are disposed crossing each other in a center portion within the plane of the liquid crystal display panel 60 with the touch sensor. A part (hereinafter, referred to as 'display part') where the plurality of common electrodes 43 and the plurality of detection electrodes 44 for the sensor are disposed crossing each other is a part corresponding to the image display surface 60A. In an outer edge part (that is, peripheral black part) within the plane of the liquid crystal display panel 60 with the touch sensor, the selection unit 51 (switching elements 51A and 51B), the oscillation unit 52, the conversion unit 53, the peripheral circuit 40, the control unit 54, the output unit 55, the input unit 56, and a flexible printed circuit board (FPC) 57 are disposed.

For example, an end of the FPC 57 is fixed to an end edge of the pixel substrate 3, and the other end of the FPC 57 is connected to a device (not shown) processing an output signal from the liquid crystal display panel 60 with the touch sensor. The FPC 57 has a flexible base film. Here, an end of the base film is fixed to an end edge of the pixel substrate 3, and the other end of the base film is an open end.

The selection unit 51, the oscillation unit 52, the conversion unit 53, and the peripheral circuit 40 are disposed on the above described counter substrate 4, and the control unit 54, the output unit 55, the input unit 56, and the FPC 57 are disposed on the above described pixel substrate 3. Specifically, the switching element 51A is disposed along a side of the display part, and the switching element 51B is disposed along a side adjacent to a side in which the switching element 51A is disposed, that is, the other side of the display part. In a peripheral edge of the display part, the oscillation unit 52 and the conversion unit 53 are disposed in a part where an end of the switching element 51A and an end of the switching element 51B are adjacent to each other. By such a layout, a wiring from the sensor unit 21 to the oscillation unit 52 may be shortened.

In addition, in the peripheral edge of the display part, a common electrode driver 47 and a signal line selector 46 included in the peripheral circuit 40 are disposed in a part where the switching elements 51A and 51B are not disposed. Further, in the pixel substrate 3, the control unit 54, the output unit 55, the input unit 56, and the FPC 57 are disposed in a part that does not face the counter substrate 4.

[Effect]

In the present embodiment, similarly to the above described embodiment, the switch unit 52D that performs electrical connection/disconnection between the wiring connecting the oscillation unit 52 and the selection unit 51 and the constant voltage line Lx is provided in the detection device 3. Thus, the switch unit 52D performs the electrical connection/disconnection while driving the detection electrodes 21H and 21V, so that charges accumulated in the detection electrodes 21H and 21V are discharged to the constant voltage line Lx through the switch unit 52D. For example, when the conversion unit 53 is in a disabled state, the control unit 54 turns on the switch unit 52D, so that the one or plurality of detection electrodes 21H and 21V selected by the selection unit 51 is connected to the constant voltage line Lx through the switch unit 52D, and the charges accumulated in the detection electrodes 21H and 21V are discharged to the constant voltage line Lx through the switch unit 52D. As a result, it is possible to eliminate accumulation of the charges in the detection electrodes 21H and 21V, and to stabilize the electrostatic capacitance of the detection electrodes 21H and 21V, so that it is possible to stabilize detection sensitivity while driving the detection electrodes 21H and 21V.

In addition, in the present embodiment, the wiring from the sensor unit 21 to the oscillation unit 52 is shortened. In addition, the sensor unit 21, the selection unit 51, the oscillation unit 52, the conversion unit 53, and the peripheral circuit 40 are disposed in the same substrate, and a protection circuit for countering ESD (Electrostatic discharge) is not provided. Thus, it is possible to reduce influence of parasitic capacity, thereby suppressing a reduction in the detection sensitivity.

4. Modified Example

As above, the present disclosure has been described based on the embodiment and the modified embodiment. However, the present disclosure is not limited to the embodiment, and various modifications are possible.

Figure 13:
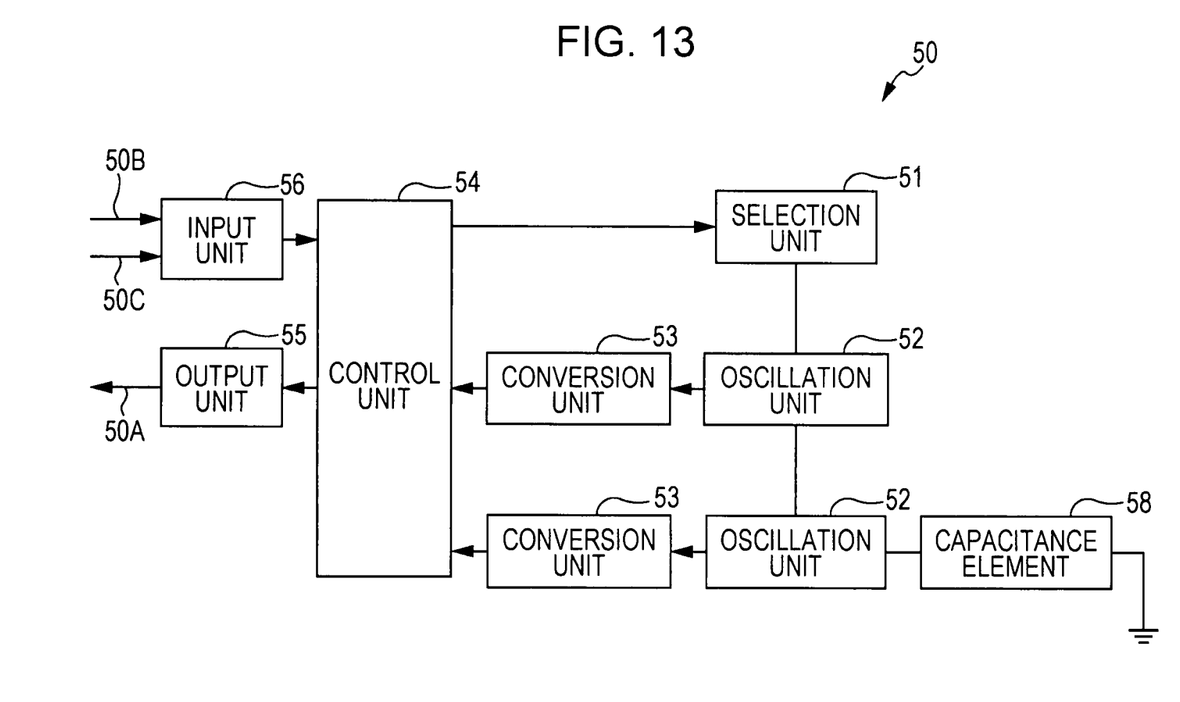
FIG. 13 is a view showing another configuration example of the detection device of FIG. 3.

For example, in the above described embodiment, the control unit 54 may correct the change in the frequency occurring due to temperature characteristics of the oscillation unit 52. For example, as shown in FIG. 13, the conversion unit 53 and the oscillation unit 52 are further provided in the detection circuit 50, and the capacitance element 58 is connected to the oscillation unit 52. In this instance, a capacitance of the capacitance element 58 is adjusted to be the same frequency as the frequency detected in the conversion unit 53 of the sensor unit 21 side. In addition, so that the conversion unit 53 and the oscillation unit 52 of the capacitance element 58 side are not affected when the finger or the like is brought close, the conversion unit 53 and the oscillation unit 52 of the capacitance element 58 side are disposed in a place separated from the sensor unit 21 or a place electrically shielded. By doing this, in the oscillation unit 52 of the capacitance element 58 side, the frequency is changed by the temperature of the oscillation unit 52. Thus, the control unit 54 performs temperature correction on the frequency detected in the conversion unit 53 of the sensor unit 21 using the frequency detected in the conversion unit 53 of the capacitance element 58 side. As a result, it is possible to suppress false detection occurring due to temperature characteristics of the oscillation unit 52.

In addition, in the above described embodiments, a case in which the transmission-type element is used as the liquid crystal display device has been described, however, for example, a reflective element other than the transmission-type element may be used. However, in this case, it is necessary that a light source (backlight 30) is eliminated, or a reflective element is disposed on the upper surface side of the liquid crystal display device.

In addition, in the above described embodiments, a case in which the present disclosure is applied to the display apparatus using the liquid crystal display device as the display device has been described, however, it may be applied to the display apparatus using the display device for example, an organic EL device, other than this case.

In addition, the series of processes described in the above embodiments may be performed by hardware or software. In a case in which the series of processes are performed by the software, a program constituting the software is installed on a general-purpose computer and the like. The program may be previously recorded on a recording medium built in the computer.

The present disclosure contains subject matter related to that disclosed in Japanese Priority Patent Application JP 2010-156894 filed in the Japan Patent Office on Jul. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A detection device, comprising:
a sensor unit in which detection electrodes are positioned in a detection surface;
a selection unit that selects one or more of the detection electrodes;
an oscillation unit in which an oscillation frequency is determined by a capacitance generated in the one or more detection electrodes selected by the selection unit;
a conversion unit that outputs a signal corresponding to the frequency of a signal from the oscillation unit; and
a switch unit that performs an electrical connection/disconnection between a wiring for connecting the oscillation unit and the selection unit and a constant voltage line, wherein
the oscillation unit changes a state between being enabled and disabled,
the detection device further comprises a control unit that disables and enables the oscillation unit and controls the switch unit while the selection unit selects the one or more detection electrodes, and connects the one or more detection electrodes selected by the selection unit to the constant voltage line, and
while the selection unit selects the one or more detection electrodes,
the control unit disables the oscillation unit and connects the one or more detection electrodes selected by the selection unit to the constant voltage line by controlling the switch unit to discharge charges accumulated in the one or more detection electrodes selected by the selection unit immediately before enabling the oscillation unit, and
after the discharging, the control unit disconnects the one or more detection electrodes selected by the selection unit from the constant voltage line by controlling the switch unit, and enables the oscillation unit.

2. A display apparatus, comprising:
a display panel that displays an image on a display surface based on an image signal;
a sensor unit in which detection electrodes are disposed on the display surface;
a selection unit that selects one or more of the detection electrodes;
an oscillation unit in which an oscillation frequency is determined by a capacitance generated in the one or more detection electrodes selected by the selection unit;
a conversion unit that outputs a signal corresponding to the frequency of a signal from the oscillation unit; and
a switch unit that performs an electrical connection/disconnection between a wiring for connecting the oscillation unit and the selection unit and a constant voltage line, wherein the oscillation unit changes a state between being enabled and disabled, the display apparatus further comprises a control unit that disables and enables the oscillation unit and controls the switch unit while the selection unit selects the one or more detection electrodes, and connects the one or more detection electrodes selected by the selection unit to the constant voltage line, and while the selection unit selects the one or more of detection electrodes, the control unit disables the oscillation unit and connects the one or more detection electrodes selected by the selection unit to the constant voltage line by controlling the switch unit to discharge charges accumulated in the one or more detection electrodes selected by the selection unit immediately before enabling the oscillation unit, and after the discharging, the control unit disconnects the one or more detection electrodes selected by the selection unit from the constant voltage line by controlling the switch unit, and enables the oscillation unit.

* * * * *